G. P. DORR.
ROTARY PUMP.
APPLICATION FILED AUG. 4, 1919.
1,323,459.
Patented Dec. 2, 1919.
2 SHEETS—SHEET 1.
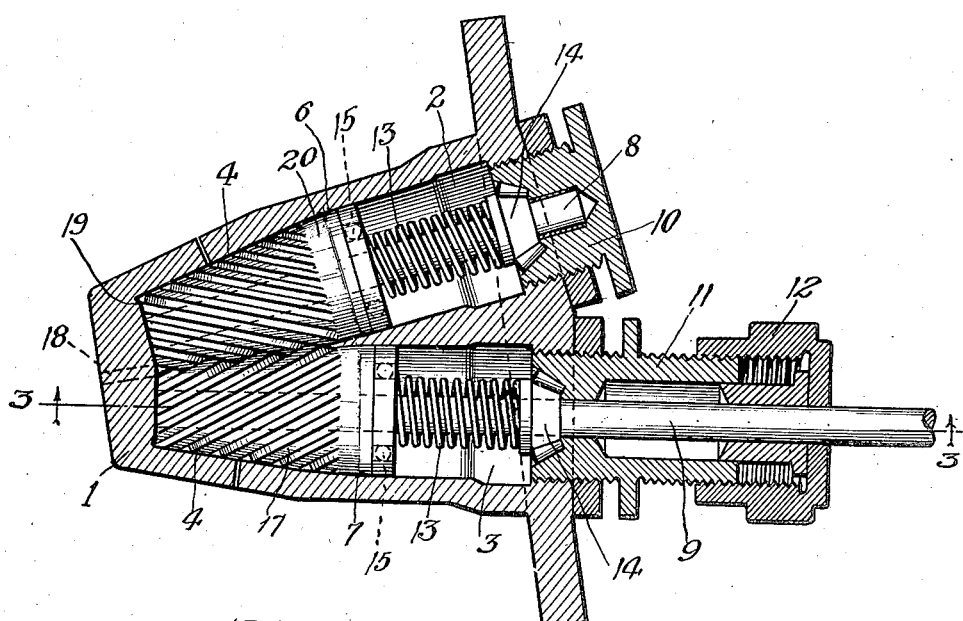
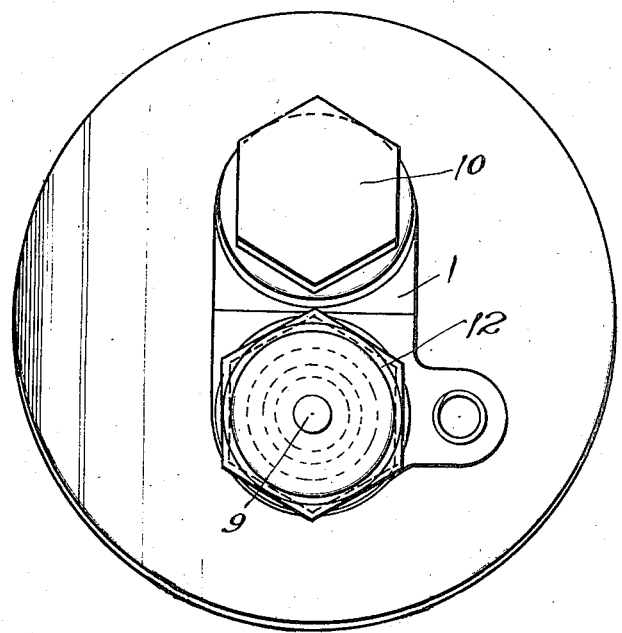
Inventor:
George P. Dorr
By Chamberlin Brendepreid
Attys

G. P. DORR.
ROTARY PUMP.
APPLICATION FILED AUG. 4, 1919.

1,323,459.

Patented Dec. 2, 1919.
2 SHEETS—SHEET 2.

UNITED STATES PATENT OFFICE.

GEORGE P. DORR, OF CHICAGO, ILLINOIS.

ROTARY PUMP.

1,323,459.   Specification of Letters Patent.   Patented Dec. 2, 1919.

Application filed August 4, 1919. Serial No. 315,141.

*To all whom it may concern:*

Be it known that I, GEORGE P. DORR, a citizen of the United States, residing at Chicago, county of Cook, State of Illinois, have invented a certain new and useful Improvement in Rotary Pumps, and declare the following to be a full, clear, and exact description of the same, such as will enable others skilled in the art to which it pertains to make and use the same, reference being had to the accompanying drawings, which form a part of this specification.

A common type of pump is that in which the pressure or suction is produced by the action of intermeshing gears mounted in a closely fitting housing. The only way in which successful operation may be obtained and leakage loss avoided is to grind the gears and the housings so as to produce an extremely accurate fit. This is not only expensive as to initial cost but, since wear begins to take place as soon as a machine is set in operation, the nice initial adjustment cannot be maintained and the efficiency soon decreases rapidly. The object of the present invention is to produce a pump of the rotary gear type which shall be simple to manufacture in such a manner as to bring about the requisite accuracy of fit to secure a high degree of efficiency in operation, and which will automatically maintain itself in a condition which will insure continued efficiency.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a horizontal axial section through a pump arranged in accordance with the preferred form of my invention;

Fig. 2 is an end view looking at the right hand end of Fig. 1;

Figure 3:
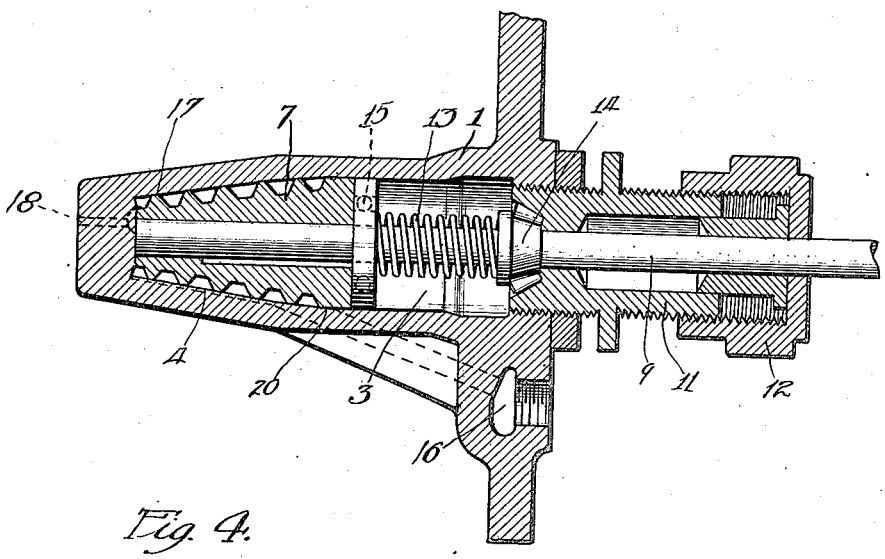
Fig. 3 is a section taken approximately on line 3—3 of Fig. 1.
Figure 4:
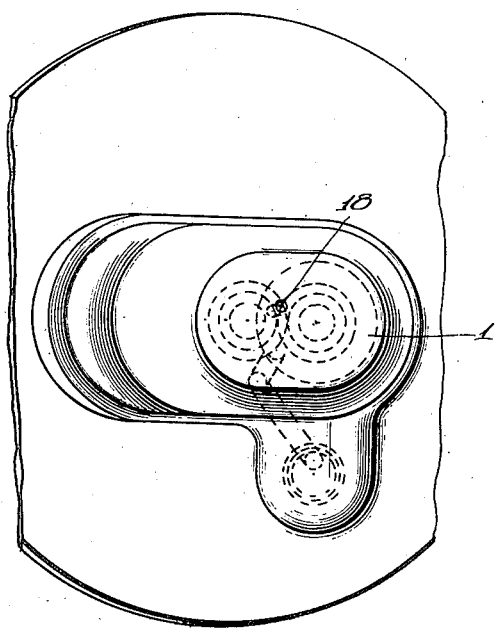
Fig. 4 is a view similar to Fig. 2 showing the opposite end of the device.
Figure 5:
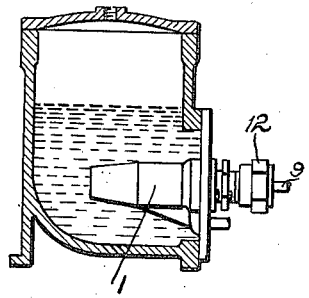
Fig. 5 is a side elevation of the pump on a greatly reduced scale, mounted in an oil chamber which is shown in section.

Referring to the drawings, 1 represents a gear casing containing two pockets or chambers, 2 and 3, arranged at a slight angle to each other and merging together at their inner ends. The outer portions of the chambers 2 and 3 may be cylindrical, but the inner portions, as indicated at 4, 4, are in the form of frustums of cones. 6 and 7 represent gear wheels elongated in the axial direction, each shaped so that at one end it fits accurately into one of the conical portions, 4, of the gear chambers, while at its other end it fits into the adjacent cylindrical portion of the corresponding chamber. The gears are fixed upon shafts, 8 and 9, coaxial therewith. The shaft 8 terminates in a suitable bearing in a plug, 10, closing the outer end of the chamber 2 while the shaft 9 extends out through a suitable gland, 11, and stuffing box, 12, beyond the chamber 3 and forms the driving member for the pump. Each of the gear chambers as a whole is made considerably longer than the corresponding gear so as to provide room for a compression spring, 13, in the chamber beyond the outer end of the gear. In the arrangement shown, each gear seats itself at its smaller end against the inner end of its chamber, the spring exerting a pressure in the direction tending to force the gear farther into the chamber. In the arrangement shown, there are roller bearings, 14, in the members 10 and 11, for the shafts 8 and 9 respectively; while, at the outer end of each gear may be placed a suitable ball bearing or roller bearing, 15, in order that each shaft may have two anti-friction bearings.

The inlet to the pump is through a passage, 16, which leads to the interior of one of the gear chambers, namely the gear chamber 3 at a point or along a line corresponding to a tooth in the gear member 4 which is about ready to come into mesh with the coöperating gear. Consequently the valley between two adjacent teeth will be filled with the fluid to be pumped, and as a tooth on the coöperating gear enters the valley, it compresses the fluid. By making the gear teeth 17 spiral, as illustrated, an effect is produced similar to that in the ordinary herring-bone type pump namely: The fluid confined in the valley under consideration is not only compressed but is gradually forced lengthwise, in this instance toward the smaller ends of the gears. Therefore, by leading a discharge port, 18, out of the closed end of the gear casing from a point lying approximately in a plane containing the axes of the two shafts, the fluid to be pumped can be discharged from the gear casing at a maximum pressure. The small ends of the gears are preferably so shaped that the marginal portions, 19, of the end faces, of a width at least equal to the depth of the teeth are at right angles to the elements of the cones; thus insuring that a tight joint will be made between the end walls of the gear chambers, which are shaped so as to be complementary to the ends of the gears, and the gears around the discharge port 18.

It will be seen that the fitting of the conical gears into their respective chambers is a comparatively simple matter and, because the springs are constantly tending to force the gears farther into the conical ends of the chambers, the gears will soon fit themselves securely into their seats if the fit happens to be slightly imperfect at the beginning; and, as wear takes place, the springs will automatically adjust the gears so as to maintain them properly fitted into their seats.

The teeth of the gears preferably terminate in the conical portion of the gears so that each gear will have a part, 20, more or less conical and with an uninterrupted surface near its larger end adapted to grind itself a seat and produce a tight joint as between a valve and the seat. Thus all danger of leakage past the large ends of the gears is avoided.

I claim:

1. A pump comprising a gear casing provided with chambers arranged at a slight angle to each other and merging into each other at one end, each of said chambers being in the form of a frustum of a cone at said end, intermeshing, frusto-conical gears fitting in said frusto-conical ends, means yieldingly pressing said gears axially in the direction to move them toward the smaller ends of said chambers, and said casing having an intake port on one side of the plane containing the axes of the gears and a discharge port in the vicinity of the smaller ends of the gears.

2. A pump comprising a casing containing two gear chambers, each chamber consisting of a cylindrical portion and a frusto-conical portion having its larger end contiguous to the cylindrical portion, said chambers being arranged at a slight angle to each other and merging slightly into each other throughout their respective frusto-conical portions, intermeshing gears fitted in said chambers and each comprising a frusto-conical portion and a cylindrical portion, means for maintaining on the gears a pressure tending to force them in the direction of the smaller ends of said chambers, said casing having an inlet port at one side of a plane containing the axes of the gears, and an outlet port in the vicinity of the smallest diameter of the gears.

3. In a pump, a casing having two chambers extending inwardly from one side thereof and closed at their inner ends, each chamber having a frusto-conical inner portion, smallest at the closed end and a cylindrical portion adjacent to the frusto-conical portion, said chambers being arranged at a slight angle to each other and merging slightly into each other throughout their frusto-conical portions, gears arranged within said chambers and meshing with each other, each gear having a cylindrical outer portion and a frusto-conical inner portion, means for rotating said gears, said casing having inlet and outlet ports suitably located to permit the gears to pump fluids.

4. In a pump, a casing having elongated chambers extending inwardly from one side thereof and closed at their inner ends, said chambers being arranged at a slight angle to each other and each having an inner frusto-conical portion merging into the corresponding portion of the other chamber, frusto-conical intermeshing gears fitting in the frusto-conical portions of said chambers and engaging with the walls forming the closures for the inner ends of said chambers, shafts on which said gears are mounted, closures for the outer ends of said chambers having bearings for said shafts, said casing having suitable inlet and outlet ports communicating with said chambers.

5. In a pump, a casing having elongated chambers extending inwardly from one side thereof and closed at their inner ends, said chambers being arranged at a slight angle to each other and each having an inner frusto-conical portion merging into the corresponding portion of the other chamber, frusto-conical intermeshing gears fitting in the frusto-conical portions of said chambers and engaging with the walls forming the closures for the inner ends of said chambers, shafts on which said gears are mounted, closures for the outer ends of said chambers having bearings for said shafts, and springs in said chambers between the outer ends of the gears and the closures for the outer ends of said chambers, said casing having suitable inlet and outlet ports communicating with said chambers.

6. A pump of the rotary intermeshing gear type having gears in the form of frustums of cones fitting into correspondingly shaped gear chambers, and means tending to press said gears in the direction of the smaller ends of said chambers.

In testimony whereof, I sign this specification.

GEORGE P. DORR.